United States Patent
Sauvignet et al.

(10) Patent No.: US 7,648,637 B1
(45) Date of Patent: Jan. 19, 2010

(54) WATER TREATMENT METHOD BY BALLASTED FLOCCULATION, SETTLING, AND PRIOR ADSORBENT CONTACT

(75) Inventors: Philippe Sauvignet, Saint-Etienne-en-Cogles (FR); Abdelkader Gaid, Paris (FR)

(73) Assignee: OTV S.A., Saint-Maurice Cedex (FR)

( * ) Notice: Subject to any disclaimer, the term of this patent is extended or adjusted under 35 U.S.C. 154(b) by 0 days.

(21) Appl. No.: 12/362,156

(22) Filed: Jan. 29, 2009

(51) Int. Cl.
*C02F 1/42* (2006.01)

(52) U.S. Cl. .................. 210/661; 210/665; 210/668; 210/673; 210/748

(58) Field of Classification Search .............. 210/661, 210/665, 668, 673, 748
See application file for complete search history.

(56) References Cited

OTHER PUBLICATIONS

Process Progress: Removing Natural Organic Matter, Pesticides and Endocrine Disruptors, Water21, Feb. 2008, pp. 37-39, IWA Publishing, London, UK.

*Primary Examiner*—Chester T Barry
(74) *Attorney, Agent, or Firm*—Coats & Bennett, P.L.L.C.

(57) ABSTRACT

The invention relates to a method for removing impurities from an aqueous stream. The method includes directing the aqueous stream into an adsorbent contact zone and contacting the aqueous stream with an adsorbent material in the adsorbent contact zone so that impurities in the aqueous stream are adsorbed onto the adsorbent material. The aqueous stream and the adsorbent material is then directed to a ballasted flocculation zone where the adsorbent material is mixed with ballast to form sludge. The aqueous stream is then separated from the sludge to produce treated water and the sludge is settled in a settling zone. The ballast is then separated from the sludge and directed to the ballasted flocculation zone while the sludge and the adsorbent material are directed to a transition zone. In addition, the method requires measuring the concentration of the adsorbent material in the adsorbent contact zone and adding adsorbent material to the aqueous stream if the value of the measured concentration of the adsorbent material in the absorbent contact zone is below a predetermined threshold value.

23 Claims, 1 Drawing Sheet

Figure 1:
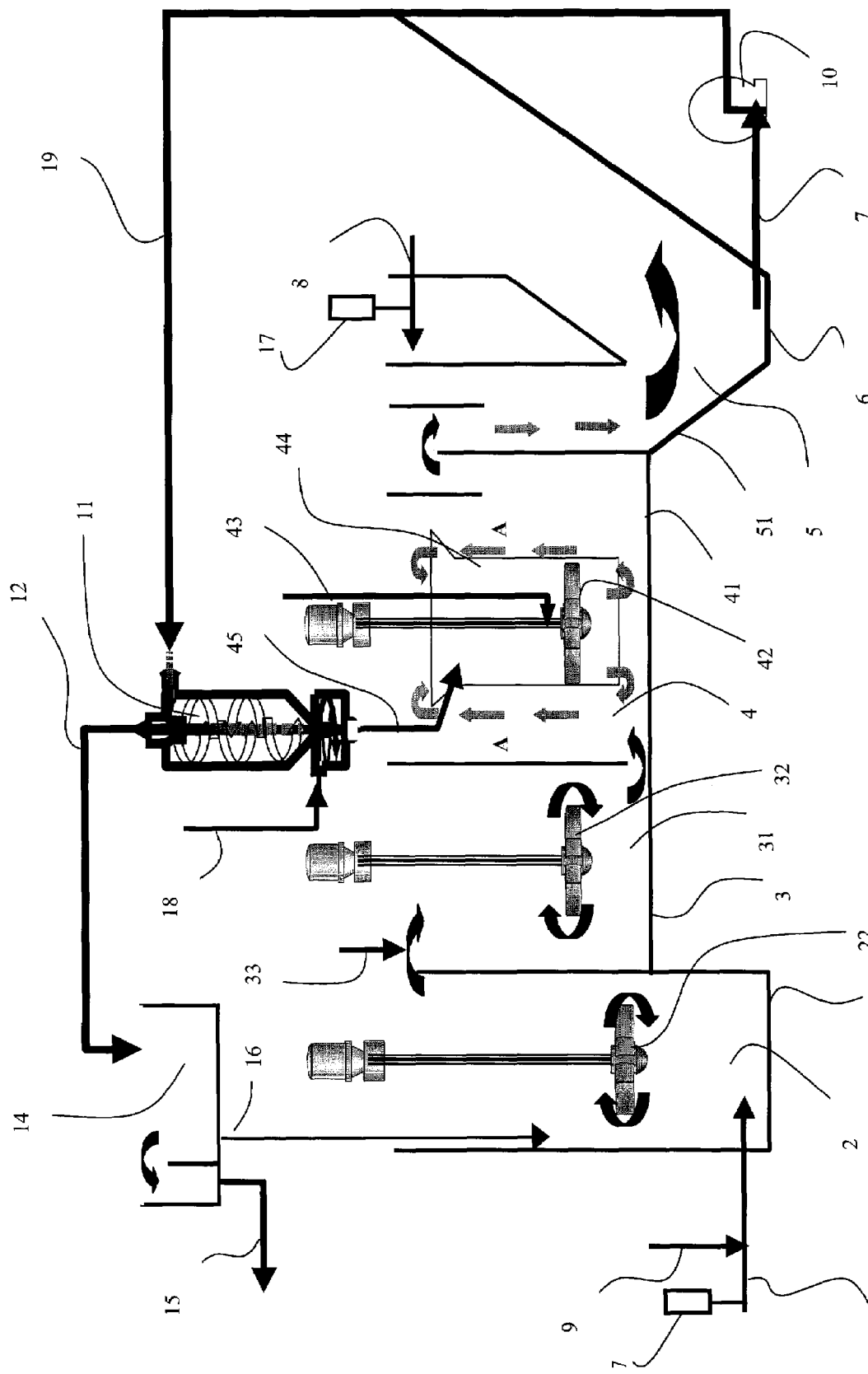

WATER TREATMENT METHOD BY BALLASTED FLOCCULATION, SETTLING, AND PRIOR ADSORBENT CONTACT

FIELD OF THE INVENTION

The field of the invention is that of the treatment of water with a view to the potabilisation thereof. It also relates to the treatment of industrial water containing adsorbable materials and the tertiary treatment of waste water with a view to the purification thereof and particularly with a view to lowering the concentration therein of agents having an endocrine disruptive effect.

More specifically, the invention relates to the physicochemical treatment of water including a solid-liquid separation by means of ballasted flocculation and settling.

State of the Related Art

The physicochemical treatment of water, whether it is used in order to potabilise surface water, karstic water, etc. or purify municipal or industrial waste water, is obtained using methods which include a succession of steps.

This type of treatment generally includes a coagulation step. The coagulation induces an agglomeration of the colloidal particles suspended in the water. This is generally obtained by introducing the water to be treated into a coagulation zone wherein a coagulant reagent, that may consist of a trivalent metal salt for example, is injected.

The water coagulated in this way is then subjected to a flocculation step. The flocculation induces the formation of flocks by the agglomeration of previously coagulated colloidal particles. This is generally obtained by introducing the coagulated water into a flocculation zone wherein a flocculent reagent usually consisting of an organic polymer is injected into the coagulated water.

Finally, the coagulated and flocculated water is subjected to a settling step in order to separate said flocks from the water. The settling is obtained by transiting the water inside a settling tank via an underflow wherefrom the sludge formed is extracted while the treated water is extracted via an overflow. The treated water may then be routed to a filtration device positioned downstream from the installation required to implement coagulation, flocculation and settling in order to undergo a subsequent polishing step.

In order to improve the formation rate of the flocks and the settling rate thereof, so-called ballasted flocculation technology has been developed. Such a technique is particularly described in the international patent applications bearing the numbers WO-A1-03/053862 and WO-A1-2008/083923 filed on behalf of the Applicant.

Ballasted flocculation consists of using a ballast generally consisting of a high-density fine granular material which is injected directly into the flocculation zone or upstream therefrom. The injection of ballast results in the relative rapid formation of ballasted flocks wherein the settling rate is increased with respect to that of a conventional flock.

The ballasted flocculation treatment, which is essentially intended to lower the content of suspended particles in the water, may be associated with an adsorption treatment wherein the use essentially results in the reduction of the dissolved pollution content in the water.

The treatment of water by means of adsorption is generally obtained by injecting in the water at least one reagent having adsorbent properties such as activated carbon.

It is known to perform injections of adsorbent reagent either directly into the flocculation and/or coagulation zones, or in a contact zone which is separated from the coagulation and flocculation zones, as specified for example in the French patent application bearing the number FR-A1-2 868 064 filed on behalf of the Applicant.

The use of these techniques is of particular interest in that they result in a significant lowering of the dissolved or suspended colloidal impurity content in the water.

However, these techniques involve some drawbacks.

DRAWBACKS OF THE PRIOR ART

In particular, an adsorption treatment may only be effective if it is controlled.

However, the lack of control of the consumption of adsorbent reagents represents a major inherent problem in the use of these water treatment techniques.

This problem is essentially conveyed in two forms: either the adsorbent reagent supply is insufficient or it is superabundant.

An insufficient adsorbent reagent supply results in a limitation of the lowering by means of adsorption of the impurities contained in the water and therefore in the production of treated water not meeting potabilisation criteria.

A superabundant adsorbent reagent supply, although it makes it possible to reduce the quantity of impurities contained in the water significantly, nevertheless induces the production of water of average quality due to the high presence of particles in the water. Indeed, when the adsorbent reagent is supplied in excessively high proportions, it is not rare for a portion thereof to be found in the water after it has been treated.

Besides the fact that poor adsorbent reagent supply control induces problems relating to the quality of the water produced, it also induces economic problems.

An insufficient adsorbent reagent supply results in the production of water of average quality wherein the improvement of the level of quality requires the use of supplementary treatments generating additional expenses.

An excessive adsorbent reagent supply represents an overconsumption which in itself generates additional expenses.

In addition, given that the quality of the water produced in the case of an excessive adsorbent reagent supply is relatively mediocre, it is also necessary to use supplementary treatments which have a negative impact on the overall water treatment cost.

Finally, poor adsorbent reagent supply control generally results in the production of water of average quality and/or an increase in the water treatment cost.

AIMS OF THE INVENTION

Therefore, the aim of the invention is particularly to remedy said drawbacks of the prior art.

More specifically, an aim of the invention is to provide, in at least one embodiment of the invention, a water treatment technique, particularly comprising ballasted flocculation and an adsorption treatment, which results in the production of high quality water, at the very least compared to the techniques of the prior art.

Another aim of the invention is, in at least one embodiment of the invention, to use such a water treatment technique which results in the reduction of treated water production costs.

A further aim of the invention is to produce, in at least one embodiment of the invention, such a water treatment technique which is particularly economical, or which is at the very least more economical than the techniques according to the prior art.

An aim of the invention is also to provide, in at least one embodiment of the invention, such a water treatment technique which is robust, effective and easy to use.

DESCRIPTION OF THE INVENTION

These aims, along with others which will emerge hereinafter, are achieved using a method for the treatment of unprocessed water charged with dissolved or suspended colloidal impurities in a treatment installation, said method comprising at least the following steps:

placing, in a stirred pre-contact zone, said water in contact with at least one powder adsorbent agent;

introducing the first mixture from said pre-contact zone into a stirred ballasted flocculation zone;

placing in said stirred ballasted flocculation zone said first mixture in contact with at least one flocculent reagent and with at least one ballast consisting of at least one insoluble granular material heavier than water to enable ballasted flock formation;

introducing the second mixture from said ballasted flocculation zone into a settling zone;

extracting a mixture of sludge, ballast and powder adsorbent agent in the lower part of said settling zone;

extracting the treated water separated from said mixture of sludge, ballast and powder adsorbent agent in the upper part of said settling zone;

introducing said mixture of sludge, ballast and powder adsorbent agent into a hydrocyclone;

recycling the underflows of said hydrocyclone essentially consisting of ballast in said ballasted flocculation zone;

routing overflows of said hydrocyclone consisting of a mixture of sludge and powder adsorbent reagent into a transition zone.

According to the invention, such a method also comprises:

a recycling step in said pre-contact zone of at least one part of the mixture of sludge and powder adsorbent agent from said transition zone;

a continuous measurement step of least one representative item of information of the powder adsorbent agent concentration in said pre-contact zone;

an injection step upstream from said pre-contact zone of a new powder adsorbent agent suspension in aqueous medium when said powder adsorbent agent concentration in said pre-contact zone is less than a pre-determined threshold value.

In this way, the invention is based on a completely novel and inventive approach which consists of controlling the water treatment by means of adsorption:

by recycling a mixture of sludge and adsorbent reagent from the overflow of a hydrocyclone connected to the underflow of a settling zone in a pre-contact zone wherein water to be treated is placed in contact with such a reagent, and by measuring a representative item of information of the powder adsorbent agent concentration in a pre-contact zone wherein the water is placed in contact with such a reagent, and by injecting upstream from said contact zone a specific quantity of new powder adsorbent agent suspended in an aqueous medium if required to maintain in the pre-contact zone a pre-determined adsorbent reagent concentration so as to produce water of suitable quality.

Therefore, the use of such a technique makes it possible to recycle part of the adsorbent reagent already used and inject in the water to be treated a necessary accurate quantity of a new adsorbent reagent suspension in aqueous medium so as to produce quality water while limiting the adsorbent reagent consumption and limiting the number of treatment operations required for water production.

Therefore, the use of the technique according to the invention results in the production of water of at least equivalent quality but at a lower cost than the techniques according to the prior art.

The powder adsorbent reagent concentration of the suspension is advantageously between 5 and 50 mg/l and preferentially between 5 and 15 mg/l. This concentration particularly varies according to the purposes of the treatment, the quality of the adsorbent reagent used, and the pH of the water to be treated.

According to an advantageous feature, said continuous measurement step of at least one representative item of information of the powder adsorbent agent concentration in said pre-contact zone comprises the sub-steps consisting of:

measuring the UV absorbance of said unprocessed water;

measuring the UV absorbance of said treated water;

deducing, from the absorbance measurements, the powder adsorbent agent concentration.

Indeed, the use of these sub-steps makes it possible to obtain, simply, effectively and accurately, a representative item of information on the adsorbent agent concentration present in the pre-contact zone. This makes it possible to readjust this concentration in a satisfactory manner with a suitable supply of new adsorbent agent and limit the consumption of said agent(s) as precisely as possible accordingly.

According to an advantageous feature, said powder adsorbent agent consists of powder activated carbon.

In this case, the threshold concentration value of said powder activated carbon in said pre-contact zone is preferentially between 0.5 and 10 g/l.

An adsorbent agent concentration in the pre-contact zone of less than 0.5 g/l would not make it possible to treat the water in a satisfactory manner in that the adsorption capacity of the method according to the invention would be insufficient. However, it has been observed that, if this concentration is maintained above 3 g/l, the adsorption capacity of the adsorbent agent increases, but significantly.

If the powder adsorbent agent concentration in the pre-contact zone is greater than 5 g/l, the treated water from the method contains a certain proportion of said agent(s) so as to have a negative impact on the downstream treatments. In particular, if these treatments involve the direct use of filtration membranes, an excessively high adsorbent agent concentration may result in the clogging of the membranes and therefore the reduction of the filtration time thereof.

In order to prevent this drawback, it may be envisaged to increase the flocculent agent (for example polymer) concentration in the flocculation zone. However, this results in an increase in the water treatment cost.

Advantageously, said threshold concentration value of said powder activated carbon in said pre-contact zone varies between 1 and 3 g/l.

Such an adsorbent agent concentration in the pre-contact zone makes it possible both to maintain a satisfactory adsorption level and to limit the proportion of residual adsorbent agent in the treated water and therefore limit the incidence of negative impact on the downstream treatments.

Advantageously, said powder activated carbon displays a grain size distribution between 8 and 60 micrometers.

According to a preferential feature, said powder activated carbon displays a grain size distribution between 15 and 35 micrometers.

Such a grain size distribution, equivalent to that of a conventional powder activated carbon, associated with an adsorbent agent concentration value in the pre-contact zone between 0.5 and 5 g/l enables the generation of an overall specific surface area giving the method a satisfactory adsorption capacity.

According to another preferential feature, said powder activated carbon displays a grain size distribution between 8 and 15 micrometers. Such a grain size distribution, which is equivalent to that of a calibrated powder activated carbon, makes it possible, at equal adsorbent agent concentrations, to increase the specific surface area thereof and increase the adsorption capacity of the method according to the invention accordingly.

According to another preferential feature, said powder activated carbon displays a grain size distribution less than 1 micrometer.

Such a grain size distribution, which is equivalent to that of a micronised powder activated carbon, makes it possible, at equal adsorbent agent concentrations, to increase the specific surface area thereof further and increase the adsorption capacity of the method according to the invention accordingly. Such a powder activated carbon is generally marketed directly in the form of an emulsion and thus offers the advantage of being easy to use without requiring the use of a specific apparatus as is the case when conventional or calibrated powder activated carbon is used. Indeed, the use of PAC of this type requires, prior to the injection thereof, the mixing thereof with non-drinkable water, which requires costly specific means, such as tanks housing stirrers.

According to a preferred aspect, a method according to the invention comprises an acidification step of said suspension.

The use of such a step makes it possible to reduce the size of the adsorbent agent particles and, at equal concentrations, to increase the overall specific surface area thereof in contact with the water to be treated. This results in an improvement of the adsorption capacities of a method according to the invention.

Conversely, at equal performances, the use of said acidification makes it possible to reduce the adsorbent agent consumption further. This results in the quantity of residual adsorbent agent in the treated water being lower, which has a positive impact on the treatments used downstream from the method according to the invention.

Said acidification step preferentially comprises an injection of acid in said new powder adsorbent agent suspension in aqueous medium up to a pH value between 2 and 5.

Preferentially, acid will be injected into the suspension until a pH between 3 and 4 is obtained.

Particularly preferentially, acid will be injected into the suspension until a pH equal to 3 is obtained.

According to a preferred aspect, a method according to the invention comprises a coagulation step of said unprocessed water.

Advantageously, the coagulant agents and the flocculent agents are injected separately such that the effect of one does not inhibit the effect of the other.

In this case, said coagulation step advantageously comprises the injection in said unprocessed water of at least one coagulant agent upstream from said pre-contact zone.

According to a different approach, said coagulation step advantageously comprises the injection in said unprocessed water of at least one coagulant agent in the coagulation zone located between said pre-contact zone and said ballasted flocculation zone.

Adsorbent agents other than PAC may be used, such as for example adsorbent resins, expanded clays or activated alumina powder.

LIST OF FIGURES

Other features and advantages of the invention will emerge more clearly on reading the following description of a preferential embodiment, given merely as an illustrative and non-limitative example, and the sole FIG. 1 appended which illustrates an installation intended for the use of a method according to the invention.

DESCRIPTION OF AN EMBODIMENT OF THE INVENTION

1. Summary of Principle of the Invention

The general principle of the invention is based on the use of:
- a recycling step of a mixture of sludge and adsorbent reagent from the overflow of a hydrocyclone connected to the underflow of a settling zone in a pre-contact zone wherein water to be treated is placed in contact with such a reagent, and
- a measurement step of a representative item of information of the adsorbent reagent concentration in said pre-contact zone.

This makes it possible, in another step, to inject upstream from the pre-contact zone new adsorbent reagent suspended in aqueous medium, if required to maintain in said zone a pre-determined concentration of adsorbent reagent in order to produce water of suitable quality.

The use of such a technique makes it possible to control the adsorption treatment of the water and therefore produce, at a relatively reduced cost, at the very least compared to the techniques according to the prior art, water of acceptable quality.

2. Example of Installation for the Use of a Water Treatment Method According to the Invention With reference to FIG. 1, an embodiment of an installation intended for the use of a water treatment method according to the invention is described.

As represented in FIG. 1, such a water treatment installation comprises a feed pipe of unprocessed water to be treated 1 which opens into a pre-contact zone 2. Injection means, such as for example an injector 9, enable the injection in the water to be treated circulating in the feed pipe 1 of a powder adsorbent reagent suspension in aqueous medium.

The pre-contact zone 2 is delimited by the walls of a tank 21 and houses a stirrer 22. It communicates, in an upper part, with a coagulation zone 3.

Said coagulation zone 3 is delimited by the contours of a tank 31 which houses a stirrer 32. Injection means, such as for example an injector 33, enable the injection of at least one coagulant reagent in the coagulation zone 3. This coagulation zone 3 communicates in a lower part with a ballasted flocculation zone 4.

Said ballasted flocculation zone 4 is delimited by the contours of a tank 41 which houses a stirrer 42. Injection means, such as for example an injector 43, enable the injection of at least one flocculent reagent in the ballasted flocculation zone 4. Injection means 45 also make it possible to introduce, into the tank 41, ballast consisting of insoluble granular material denser than water such as sand. Said ballasted flocculation zone 4 also houses a flow guiding element which comprises an essentially tubular element 44 inside which the stirrer 42 is rotated. For this reason, the ballasted flocculation zone 4 forms a maturing zone. It communicates in an upper part with a settling zone 5.

The settling zone 5 is delimited by a tank 51 essentially defining a "U". It comprises an underflow 6 which is connected to an extraction pipe 7 of a mixture of sludge, ballast and powder adsorbent reagent. It also comprises an overflow 8 to evacuate treated water.

A pipe 19 and extraction means, such as a pump 10, enable the routing of said mixture of sludge, ballast and powder adsorbent reagent to the inlet of a hydrocyclone 11.

The hydrocyclone 11 comprises an underflow which enables the routing of a mixture of ballast and a small quantity of sludge to the injection means 45. Said underflow is connected to non-drinkable water injection means 18. This enables the injection of a mixture of ballast and diluted sludge in the ballasted flocculation zone 4. It also comprises an overflow which is connected to a pipe 12 which is used to discharge a mixture of sludge and powder adsorbent reagents into a transition zone 14.

Said transition zone 14 comprises an overflow 15 which is used to evacuate sludge to an ancillary treatment zone. It also comprises an evacuation pipe 16 of a mixture of sludge and powder adsorbent reagents which opens into the pre-contact zone 2.

Such an installation comprises measurement means of a representative item of information of the powder adsorbent reagent concentration of the water contained in the pre-contact zone 2. Said measurement means 17 comprise in this embodiment:

UV absorbance measurement means of the unprocessed water to be treated circulating in the pipe 1;

UV absorbance measurement means of treated water circulating in the overflow 8;

calculation means used to deduce from the above measurements a representative item of information of the adsorbent reagent concentration of the water contained in the pre-contact zone 2.

Said measurement means 17 are connected to control means (not shown) which make it possible to compare the representative value of the adsorbent reagent concentration of the water contained in the pre-contact zone 2 to a pre-determined reference value. Said control means also make it possible, when the value of said concentration proves to be insufficient, to control the use of the injection means 9 so as to introduce upstream from the pre-contact zone 2 a suspension in non-drinkable water of new powder adsorbent reagent such that said concentration is constant.

3. Example of a Water Treatment Method According to the Invention

A water treatment method according to the invention will now be described with reference to the installation represented in FIG. 1.

Such a method consists of routing water to be treated into the pre-contact zone 2 wherein it is placed in contact with at least one powder adsorbent reagent, such as for example PAC (Powder Activated Carbon).

After a contact time equal to 10 minutes, the mixture of water and PAC is introduced into the coagulation zone 3 wherein it is placed into contact with at least one coagulant reagent using the injection means 33. In alternative embodiments of this embodiment, said contact time may be between 5 and 15 minutes. The coagulant reagent consists of an aluminium salt wherein the concentration in the coagulation zone is equal to 1.5 mg/l. In one alternative embodiment, the coagulant reagent may consist of an iron salt. Whether the coagulant reagent is an iron salt or an aluminium salt, the concentration thereof in the coagulation zone will be preferentially between 0.5 and 3 mg/l. In another alternative embodiment, the coagulant reagent may consist of a polymer, such as Polyadamc®, wherein the concentration in the coagulation zone will be between 0.1 and 1 mg/l.

After a contact time equal to 2 minutes, the mixture of water, powder adsorbent reagent and coagulant reagent transits in the ballasted flocculation zone 4. In alternative embodiments, said contact time may be between 1 and 3 minutes.

Said mixture is placed in contact therein with:

at least one flocculent reagent using the injection means 43, and ballast using the injection means 45.

The use of the flow guide 44 enables the creation of dynamic phenomena which induces water movements represented by the arrows A. Therefore, the ballasted flocculation zone forms a maturing zone.

After a maturing time equal to 6 minutes, the mixture from the ballasted flocculation zone 4 transits in the settling zone 5. In alternative embodiments, said contact time may be between 3 and 8 minutes.

A mixture of sludge, ballast and powder adsorbent reagent is extracted via the underflow 6 of the settling zone 5 by means of the pipe 7. Treated water is collected via the overflow 8 of said settling zone.

Said mixture of sludge, ballast and powder adsorbent reagent is recirculated to the inlet of the hydrocyclone 11 by means of the pipe 19 and the pump 10.

The ballast is separated inside the hydrocyclone 11 from a mixture of sludge and powder adsorbent reagent. It is extracted therefrom via an underflow and discharged into the ballasted flocculation zone 4. The mixture of sludge and powder adsorbent reagent is in turn extracted via an overflow of the hydrocyclone 11.

Said mixture is routed via the pipe 12 into the transition zone 14. A portion of said mixture is recycled in the pre-contact zone 2.

The measurement means 17 are used continuously in order to determine a representative item of information of the powder adsorbent reagent concentration in the water contained in the pre-contact zone 2.

In this FIGURE, the UV absorbance with respect to the unprocessed water circulating in the pipe 1 and the treated water evacuation via the overflow 8 is measured so as to determine, by comparing these two values, a representative item of information of the powder adsorbent reagent concentration of the water contained in the pre-contact tank 2.

The value of this concentration is then compared, using control means, such as a computer, to a pre-determined threshold value so as to verify whether the level of said concentration is sufficiently high.

If the level of said concentration proves to be too low, the injection means 9 are used so as to inject in the water to be treated upstream from the pre-contact zone 2 a new powder adsorbent reagent suspension in aqueous medium in a quantity such that the powder adsorbent reagent concentration of the water present in the pre-contact zone 2 is kept substantially constant during the treatment.

It is envisaged for this concentration to be maintained between 0.5 and 5 g/l and advantageously between 1 and 3 g/l.

In this embodiment, it will be maintained at 2.5 grams of powder adsorbent reagent per liter of water contained in the pre-contact zone 2.

It is noted that, with each recycling thereof, the PAC adsorption capacity decreases. However, an increase in the PAC concentration in the pre-contact zone only has a slight positive impact on the adsorption capacity of a method according to the invention. Above a certain threshold, this may on the contrary produce a negative impact on the treatments liable to be positioned downstream from such a method due to the PAC content liable to be displayed by the treated water at the outlet of the method. In particular, an increase in the PAC concentration above 5 g/l of water in the pre-contact zone may induce a risk of clogging filtration membranes positioned downstream from the method.

4. Alternative Embodiments

In one alternative embodiment, the coagulation zone 3 may not be used. In this case, the water to be treated will be coagulated prior to the injection thereof in the pre-contact zone 2.

According to another alternative embodiment, an acidification step of the powder adsorbent reagent suspension in aqueous medium may be used. It may for example consist of injecting an acid into said suspension, such as sulphuric acid or preferentially citric acid. The acid will be injected into the suspension until the value of the pH thereof becomes equal to 3. In other alternative embodiments, the acid will be injected into the suspension until the value of the pH thereof is between 2 and 5 and preferentially between 3 and 4, an improvement being observed once the pH becomes equal to 5. Said acidification results in a reduction in the size of the adsorbent agent particles and, at equal concentrations, an increase in the overall specific contact surface area of said agent with the water to be treated. This results in an improvement in the adsorption capacities of a method according to the invention.

5. Advantages

The use of a water treatment method according to the invention makes it possible to control the powder adsorbent reagent supply in the water and therefore control the water treatment by means of adsorption.

The invention results in a limitation of the powder adsorbent reagent consumption and the number of operations required for the water treatment. Definitively, the use therefore makes it possible to produce water of suitable quality at a lower cost than permitted by the techniques according to the prior art.

The invention claimed is:

1. A method for removing impurities from an aqueous stream, the method comprising:
    directing the aqueous stream into an adsorbent contact zone and contacting the aqueous stream with an adsorbent material in the adsorbent contact zone so that impurities in the aqueous stream are adsorbed onto the adsorbent material;
    directing the aqueous stream containing the adsorbent material to a ballasted flocculation zone and mixing a ballast with the adsorbent material in the ballasted flocculation zone to form sludge containing ballast and the adsorbent material;
    separating the aqueous stream from the sludge to produce treated water and settling the sludge in a settling zone;
    separating ballast from the sludge, directing the separated ballast to the ballasted flocculation zone, and directing the sludge and the adsorbent material to a transition zone;
    measuring the concentration of the adsorbent material in the adsorbent contact zone; and
    adding adsorbent material to the aqueous stream if the value of the measured concentration of the adsorbent material in the absorbent contact zone is below a predetermined threshold value.

2. The method of claim 1 further comprising directing at least a portion of the adsorbent material from the transition zone to the adsorbent contact zone.

3. The method of claim 1 further comprising adding adsorbent material to the aqueous stream, upstream of the absorbent contact zone, if the value of the measured concentration of the adsorbent material in the absorbent contact zone is below a predetermined threshold value.

4. The method of claim 1 further comprising directing the aqueous stream to a coagulation zone after directing the aqueous stream to the adsorbent contact zone and prior to directing the aqueous stream to the ballasted flocculation zone; and wherein a coagulant reagent is introduced into the aqueous stream in the coagulation zone.

5. The method of claim 1 further comprising directing the aqueous stream to a coagulation zone after directing the aqueous stream to the adsorbent contact zone and prior to directing the aqueous stream to the ballasted flocculation zone; and wherein a coagulant reagent is introduced into the aqueous stream upstream from the adsorbent contact zone.

6. The method of claim 1 wherein the adsorbent material is activated carbon.

7. The method of claim 1 further comprising continuously measuring the concentration of the adsorbent material in the adsorbent contact zone.

8. The method of claim 1 wherein if the value of the measured concentration of the adsorbent material in the absorbent contact zone is below a predetermined threshold value, the adsorbent material is added to the aqueous stream in a suspension; and wherein the suspension has an adsorbent material concentration between approximately 5 mg/L and approximately 50 mg/L.

9. The method of claim 8 wherein if the value of the measured concentration of the adsorbent material in the absorbent contact zone is below a predetermined threshold value, the adsorbent material is added to the aqueous stream in a suspension; and wherein the suspension has an adsorbent material concentration between approximately 5 mg/L and approximately 15 mg/L.

10. The method of claim 1 wherein the concentration of the adsorbent material in the adsorbent contact zone is measured by:
    measuring the UV absorbance of the aqueous stream prior to directing the aqueous stream to the adsorbent contact zone;
    measuring the UV absorbance of the treated water after separating the aqueous stream from the sludge; and
    determining the concentration of the adsorbent material in the aqueous stream using the UV absorption measurements.

11. The method of claim 1 further comprising:
    measuring the UV absorbance of the aqueous stream prior to directing the aqueous stream to the adsorbent contact zone;
    measuring the UV absorbance of the treated water after separating the aqueous stream from the sludge; and determining the concentration of the adsorbent material in the aqueous stream based at least in part on the UV absorption measurements.

12. The method of claim 1 wherein the threshold concentration value of the adsorbent material in the adsorbent contact zone is between approximately 0.5 g/L and approximately 10 g/L.

13. The method of claim 12 wherein the threshold concentration value of the adsorbent material in the adsorbent contact zone is between approximately 1 g/L and approximately 3 g/L.

14. The method of claim 6 wherein the activated carbon has a grain size distribution of between approximately 8 μm and approximately 60 μm.

15. The method of claim 14 wherein the activated carbon has a grain size distribution of between approximately 15 μm and approximately 35 μm.

16. The method of claim 6 wherein the activated carbon has a grain size distribution of less than 1 μm.

17. The method of claim 8 further comprising:
adding acid to adsorbent material in the suspension if the value of the measured concentration of the adsorbent material in the absorbent contact zone is below a predetermined threshold value; and
wherein acid is added to the adsorbent material in the suspension until the suspension has a pH between approximately 2 and approximately 5.

18. The method of claim 17 further comprising:
adding acid to adsorbent material in the suspension if the value of the measured concentration of the adsorbent material in the absorbent contact zone is below a predetermined threshold value;
wherein acid is added to the adsorbent material in the suspension until the suspension has a pH of approximately 3.

19. The method of claim 6 wherein:
the activated carbon has a grain size distribution of between approximately 15 μm and approximately 35 μm;
the threshold concentration value of the adsorbent material in the adsorbent contact zone is between approximately 0.5 g/L and approximately 5 g/L; and
the adsorbent material added to the aqueous stream has a concentration between approximately 5 mg/L and approximately 15 mg/L.

20. The method of claim 4 further comprising:
reducing the size of the adsorbent in the adsorbent contact zone;
contacting the aqueous stream in the adsorbent contact zone with the adsorbent for at least approximately ten minutes;
directing the aqueous stream from the coagulation zone into an through a tubular flow guide element disposed in the ballasted flocculation zone; and
continuously measuring the concentration of the adsorbent material in the adsorbent contact zone.

21. A method for removing impurities from an aqueous stream, the method comprising:
directing the aqueous stream into an adsorbent contact zone and contacting the aqueous stream with an adsorbent material in the adsorbent contact zone so that impurities in the aqueous stream are adsorbed onto the adsorbent material;
directing the aqueous stream containing the adsorbent material to a ballasted flocculation zone and mixing a ballast with the adsorbent material in the ballasted flocculation zone to form sludge containing ballast and the adsorbent material;
separating the aqueous stream from the sludge to produce treated water and settling the sludge in a settling zone;
separating ballast from the sludge, directing the separated ballast to the ballasted flocculation zone, and directing the sludge and the adsorbent material to a transition zone;
measuring a parameter of the aqueous stream prior to directing the aqueous stream to the adsorbent contact zone;
measuring the same parameter of the treated water; and
adding adsorbent material to the aqueous stream if the values of the measured parameters indicate that adsorbent material should be added to the aqueous stream in order to maintain the concentration of the adsorbent material in the adsorbent contact zone in the range of approximately 0.5 g/L and approximately 10 g/L.

22. The method of claim 21 wherein if the values of the measured parameters indicate that adsorbent material should be added to the aqueous stream, adsorbent material in the form of powdered activated carbon in suspension is added to the aqueous stream.

23. The method of claim 21 further comprising maintaining the concentration of the adsorbent material in the adsorbent contact zone in the range of approximately 1 g/L and approximately 3 g/L.

* * * * *